(No Model.)
J. B. MAHAFFEY.
LUMBER ASSORTER.
No. 436,984. Patented Sept. 23, 1890.
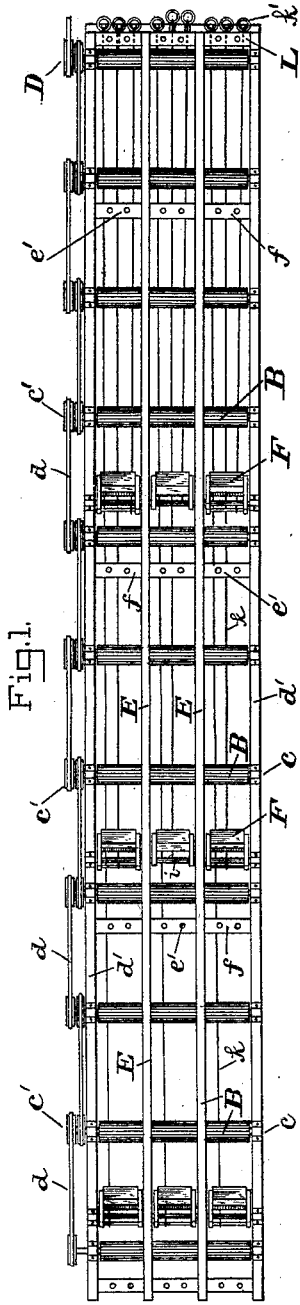
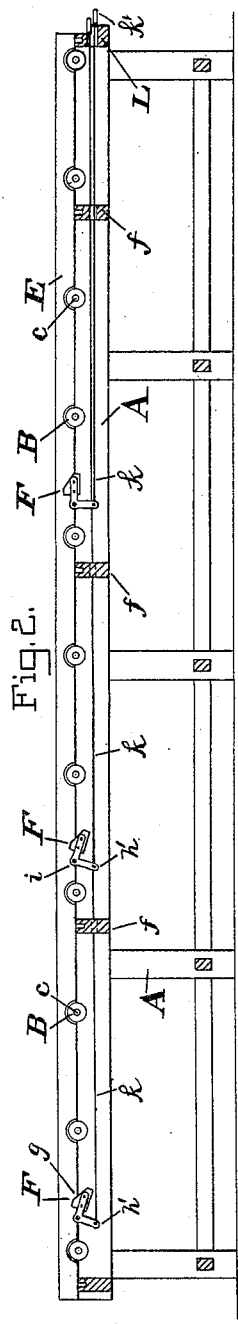
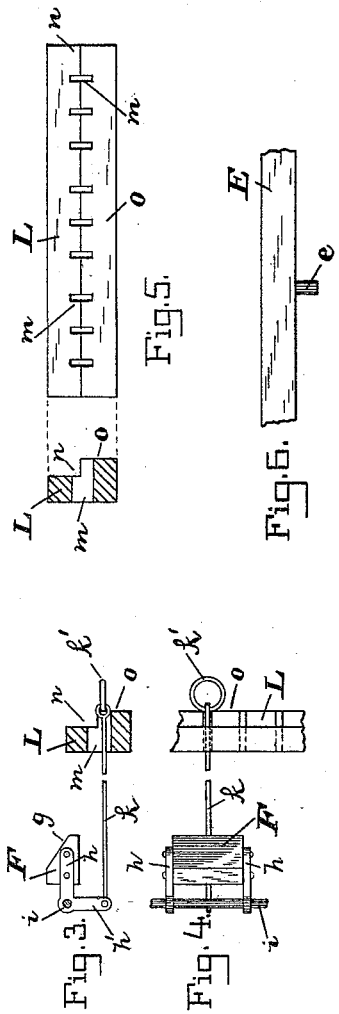
WITNESSES:
A. C. Babendreier
John E. Morris
INVENTOR:
J. B. Mahaffey
BY Chas. B. Mann
ATTORNEY.

UNITED STATES PATENT OFFICE.

JAMES B. MAHAFFEY, OF BALTIMORE, MARYLAND.

LUMBER-ASSORTER.

SPECIFICATION forming part of Letters Patent No. 436,984, dated September 23, 1890.

Application filed May 13, 1890. Serial No. 351,673. (No model.)

*To all whom it may concern:*

Be it known that I, JAMES B. MAHAFFEY, a citizen of the United States, residing at Baltimore, in the State of Maryland, have invented certain new and useful Improvements in Lumber-Assorters, of which the following is a specification.

This invention relates to an improved apparatus for conveying lumber from the machines in a wood-working mill to any desired bin or pile in the yard.

The construction and combination whereby the desired result is accomplished will be described in connection with the accompanying drawings, in which—

Figure 1 is a top or plan view of the machine. Fig. 2 is a vertical longitudinal section of the same. Figs. 3 and 4 show two views of the devices which raise and lower the stops. Fig. 5 is a view of the bar-holder for the pull-rods. Fig. 6 shows part of one of the adjustable guides.

The letter A designates the supporting-frame; B, a number of carrier or propelling rollers mounted on shafts $c$, which have bearings in the frame. On each shaft pulleys $c'$ are mounted, and all the pulleys are connected together by short belts $d$, connecting every two adjoining pulleys. On one of the shafts $c$ a main driving-pulley D is also fixed, which imparts rotary motion thereto.

Adjustable guides E extend above the rollers the entire length of the frame and are parallel with the side of the same. These guides project above the carrier-rollers and with the side bars $d'$ of the frame form guideways for the lumber or boards. The guides have pins $e$ on their under side which enter holes $e'$ in the top of the cross-pieces $f$. The holes $e'$ are so placed in the cross-pieces that the several adjustable guides E may always be parallel to each other and to the side bars $d'$ of the frame, thereby always forming parallel guideways suited for the different widths of boards. The frame with carrier-rollers may extend from a machine in the mill out into the yard or sheds as far as desired, where the boards are to be piled.

Stop devices F are employed to arrest the movement of the boards as they are carried along by the rollers. These stops may be placed in each of the guideways at any desired point on the frame adjacent to a spot in the shed where it is desired to locate a bin or a pile. The stops are vertically movable and their position normally is below the plane of the top surface of the rollers B along which the boards travel. The construction and form of these stops may vary from that here shown. In the present instance a block F is used for the stop. This block has a front inclined face $g$, and is mounted on levers $h$, which are attached to a rock-shaft $i$. When the said rock-shaft is tilted in the normal way the stops F will be down and any boards that may be traveling along the rollers B in that guideway will pass completely over the stops. When the shaft $i$ is tilted the other way the stop F will be lifted or be moved up, so that its top will be higher than the rollers, and then such stop will be directly in the path of any boards that may be traveling along in that guideway. When the stop F is in the elevated position just referred to the momentum of a board traveling upon the carrier-rollers B will cause it to ride up on the raised stop F, and by doing so the greatest surface and weight of the board will be taken off the carrier-rollers B and will rest on the stop F, and consequently the motion of the board will be arrested, the carrier-rollers having lost their control. Each rock-shaft $i$ has an arm $h'$, and a wire or cord $k$ is attached to this arm, and all the wires extend along the frame to the front end, (at the right hand in the drawings,) where the operator or attendant has position. Each wire $k$ at this end has a ring or other pull device $k'$.

At the front end of the frame is a slotted cross-bar L. The slots $m$ are shown in Fig. 5. This bar has on its vertical front side a rabbet $n$, extending lengthwise and cutting through all the slots $m$. Each wire $k$ passes through a slot $m$. When a stop device F is to be raised its wire $k$ will be pulled by the operator, and the pull-ring $k'$ of said wire will be depressed until it takes position on the outermost vertical front side $o$ of the slotted cross-bar, as shown in Figs. 3 and 4. When a stop device F is to be lowered its pull-ring $k'$ will be lifted, whereupon the weight of the stop F will draw the ring back, and the ring will then take position on the horizontal part of the rabbet $n$. Thus it will be seen that the operator at the front end of the machine can stop a board at any desired bin or pile by drawing out the corresponding pull-ring, and thereby raise the desired stop in the guideway before placing the board into said guideway. When the board has been stopped by the action of the device F it is taken from the machine by the person stationed at the bin or pile and placed in the same. One person may have charge of two or three bins or piles in his immediate vicinity, or, if necessary, one may be placed at each bin or pile.

Having described my invention I claim—

1. In a machine for conveying lumber or boards, the combination of a supporting-frame, rotary propelling or carrier rollers on the frame, and a vertically-movable stop device F, for arresting the movement of the boards, a slotted bar at the front of the machine provided with a rabbet extending lengthwise and cutting through all the slots, a wire secured to each stop at one end and having its opposite end passed through one of the slots, and provided with a pull-ring for engaging with the front of the bar.

2. In a machine for conveying lumber or boards, the combination of a supporting-frame, rotary propelling or carrier rollers on the frame, a vertically-movable stop device F, having an upwardly and rearwardly inclined front face for arresting the movement of the boards, and a means for operating the same.

3. In a machine for conveying lumber or boards, the combination of a supporting-frame, revoluble carrier-rollers on the frame, a vertically-movable stop device F, for arresting the movement of the boards, a slotted cross-bar, and a wire or cord connecting with said stop device and passing through the slot in the cross-bar and provided with a pull device.

In testimony whereof I affix my signature in the presence of two witnesses.

JAMES B. MAHAFFEY.

Witnesses:
JNO. T. MADDOX,
JOHN E. MORRIS.